United States Patent
Sauls

(10) Patent No.: US 6,752,328 B2
(45) Date of Patent: Jun. 22, 2004

(54) VEHICLE-MOUNTABLE PARTICLE SPREADER

(76) Inventor: Perry Sauls, 206 Devie La., Varnville, SC (US) 28844

(*) Notice: Subject to any disclaimer, the term of this patent is extended or adjusted under 35 U.S.C. 154(b) by 104 days.

(21) Appl. No.: 10/086,458

(22) Filed: Mar. 1, 2002

(65) Prior Publication Data

US 2003/0164416 A1 Sep. 4, 2003

(51) Int. Cl.$^7$ ................................................ B05B 9/00
(52) U.S. Cl. ..................... 239/175; 239/176; 239/657; 239/676
(58) Field of Search .............................. 239/172, 175, 239/176, 657, 661, 676, 650; 222/608–610, 613, 614, 626, 627, 504, 559, 560, 181.2, 181.3

(56) References Cited

U.S. PATENT DOCUMENTS

| | | | |
|---|---|---|---|
| 3,212,824 A | * 10/1965 | Emery et al. | 406/90 |
| 3,371,939 A | * 3/1968 | Welk | 280/830 |
| 3,398,861 A | * 8/1968 | Ulrich | 222/52 |
| 4,072,272 A | 2/1978 | Harder | |
| 4,179,048 A | 12/1979 | Pickett | |
| 4,688,979 A | * 8/1987 | Kupersmit | 414/403 |
| 4,700,640 A | 10/1987 | Andersson | |
| 4,926,768 A | 5/1990 | Magda | |
| 4,986,220 A | 1/1991 | Reneau et al. | |
| 5,038,981 A | 8/1991 | McDaniel | |
| 5,485,963 A | 1/1996 | Walto et al. | |
| 5,810,374 A | 9/1998 | Small | |
| 5,944,264 A | 8/1999 | Truax et al. | |
| 6,070,814 A | 6/2000 | Deitesfeld | |
| 6,082,300 A | 7/2000 | Futch | |
| 6,142,397 A | 11/2000 | Clay | |

* cited by examiner

Primary Examiner—Christopher Kim
(74) Attorney, Agent, or Firm—Kathleen M. Harleston; Harleston Law Firm, LLC

(57) ABSTRACT

A spreader device for distributing particles over a large area of ground includes:
- (a) a hollow, barrel-shaped body including a distribution door covering an opening at a front, lower end of the barrel-shaped body, and a fill door covering an opening in an upper, rear portion of the barrel-shaped body;
- (b) a frame on which the barrel-shaped body is mounted at a forward angle, with the front portion of the barrel-shaped body being substantially lower than the rear portion;
- (c) a remote-operated door opening mechanism attached to the barrel-shaped body for periodically opening and closing the door; and
- (d) a remote switch mechanism for activating the door opening mechanism.

12 Claims, 6 Drawing Sheets

VEHICLE-MOUNTABLE PARTICLE SPREADER

BACKGROUND OF THE INVENTION

1. Technical Field

The present invention relates to a spreader for distributing particulate feed, seed, fertilizer, and the like, which can be pulled behind a vehicle.

2. Background Information

Heretofore, many hunters have simply thrown handfuls of corn kernels off the back of a slowly moving truck to attract deer or other game to an area. Unfortunately, this requires both a truck driver and a person on the truck bed. The spreader of the present invention allows a hunter or game keeper to distribute corn kernels or other particulate bait relatively evenly along a trail to attract deer and other game, yet it does not require frequent stopping and starting and is not labor-intensive. This spreader can be pulled along behind an all-terrain vehicle, for example. Since it includes a hand-operated lever just below a handle of the vehicle, only one person is required to operate this spreader. The operator need not stop along the way to get out of the vehicle and distribute feed. A large amount of rough or smooth terrain can be covered using the present invention.

The spreader device of the present invention can also be utilized by animal keepers to feed their charges. For example, zoo keepers can use this spreader in certain exhibits to feed ungulates or other herd animals, game keepers can use the spreader to feed wild animals on a game preserve, homeowners can use it to spread bird or small animal feed over large lawns, golf course groundskeepers can attach the spreader to a lawn tractor for spreading grass seeds or duck feed, and farmers can use it to distribute feed pellets over a pasture. The spreader device can be used by lawn care employees or homeowners to distribute seeds, particulate fertilizer, or weed control products in a controlled manner over a large area of ground. The spreader device of the present invention can alternatively be mounted on a cart equipped with snow tires for winter use in spreading salt, sand, or other suitable particles over iced roadways. In the latter case, it can be pulled behind any truck or other vehicle which travels efficiently at a slow speed over ice.

BRIEF SUMMARY OF THE INVENTION

The present invention is a spreader device for quickly and easily distributing particles over a substantial area of ground, which includes:

(a) a hollow, barrel-shaped body comprising a distribution door covering an opening at a front, lower end of the barrel-shaped body, and a fill door covering an opening in an upper, rear portion of the barrel-shaped body;

(b) a frame on which the barrel-shaped body is mounted at a forward angle, with the front portion of the barrel-shaped body being substantially lower than the rear portion;

(c) a remote-operated door opening mechanism attached to the barrel-shaped body for periodically opening and closing the door; and (d) a remote switch mechanism for activating the distribution door opening mechanism. The spreader device is preferably mounted on a bed of a two-wheeled cart, and detachably coupleable to the rear of an all-terrain vehicle.

BRIEF DESCRIPTION OF THE SEVERAL VIEWS OF THE DRAWINGS

A more complete understanding of the invention and its advantages will be apparent from the following detailed description taken in conjunction with the accompanying drawings, wherein examples of the invention are shown, and wherein.

DETAILED DESCRIPTION OF THE INVENTION

Figure 1:
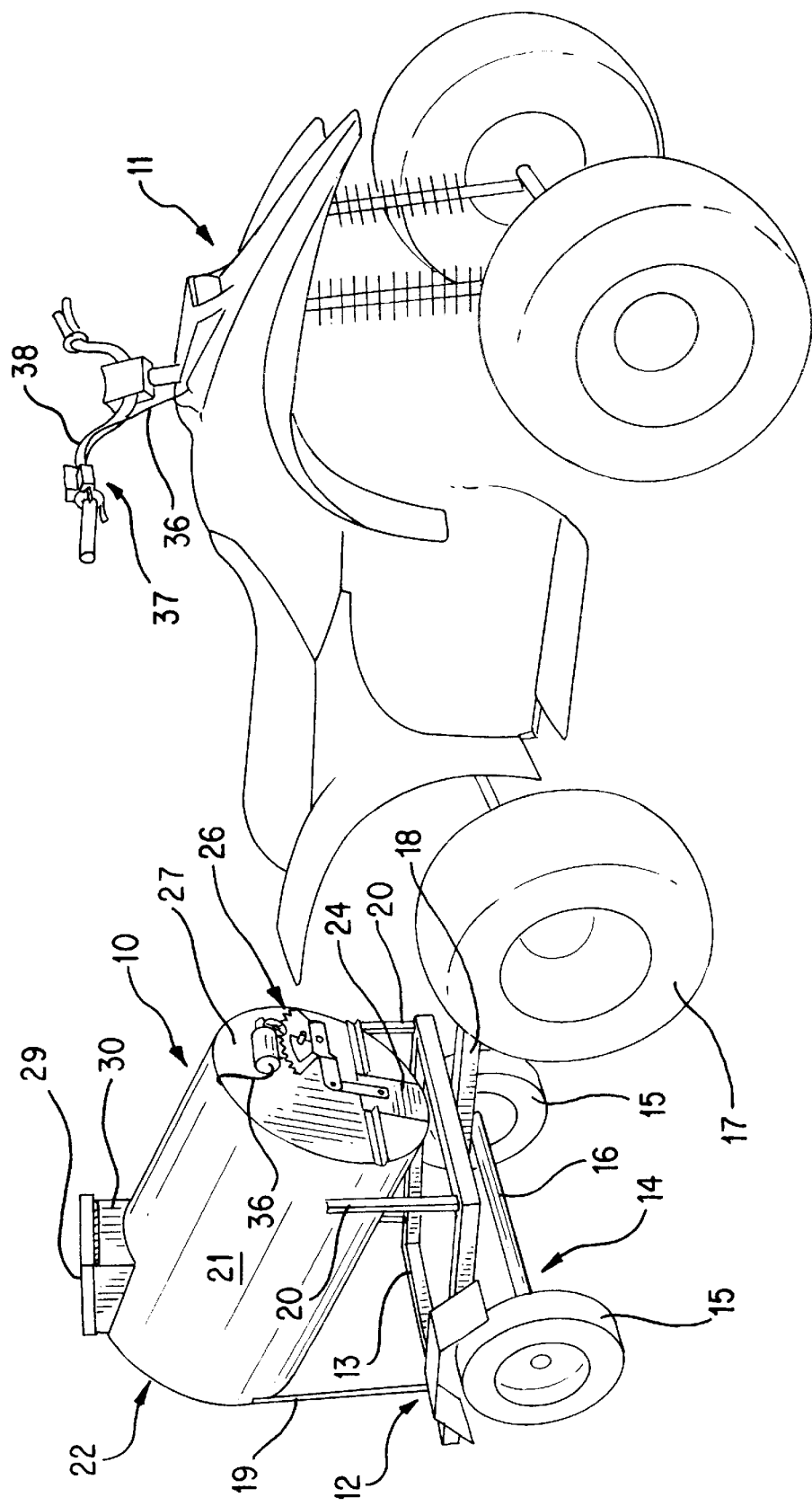
FIG. 1 is a front perspective view of a spreader device according to the present invention, shown attached to an all-terrain vehicle.

In the following description, like reference characters designate like or corresponding parts throughout the several views. Also, in the following description, it is to be understood that such terms as "front," "back," "inside," and the like are words of convenience and are not to be construed as limiting terms. Referring in more detail to the drawings, the invention will now be described.

Turning first to FIG. 1, a spreader device 10 according to the present invention is shown removably attached to an all-terrain vehicle 11. The vehicle-mountable spreader is for use by hunters, lawn care personnel, homeowners, animal keepers, road crews, etc. for spreading particulate feed, seed, fertilizer, etc. over a large area of ground. The spreader device 10 is preferably attached to any suitable motorized vehicle, preferably an all-terrain vehicle ("ATV"), or other means of conveyance. An ATV is preferred because it allows an individual to travel slowly and efficiently through narrow pathways in the woods, over fields, or over other rough terrain. The present spreader device enables one individual to accomplish the task with ease.

The preferred embodiment of the spreader device 10 of FIG. 1 comprises a frame 12, which is mounted on the bed 13 of a wheeled cart 14. The cart 14 includes a pair of wheels 15 mounted on either end of an axle 16. Each cart wheel 15 preferably has a wide diameter for ease in traveling over rough terrain. The cart wheels 15 are preferably mounted on either side of the cart no farther apart than the wheels 17 of the vehicle that will pull the cart, as shown in FIG. 1. This is for stability and ease in traveling over narrow trails on, for example, a hunting preserve.

With continued attention to FIG. 1, the cart 14 has a central tongue 18 which extends forward to the ATV 11. The free end of the tongue 18 is connected by any suitable conventional fastening mechanism to a rear hitch of the vehicle which will be pulling the cart 14 and spreader device 10.

As illustrated in FIG. 1, the frame 12 includes four vertically mounted posts extending in an upward direction from four corners of the generally horizontal cart bed 13. A square metal bed 13 without a floor is shown in FIG. 1. Two same-sized rear frame posts 19 are substantially longer than two same-sized front frame posts 20. In this preferred embodiment, the two rear frame posts 19 are the same height as one another, and the two front frame posts 20 are of the same height.

Figure 2:
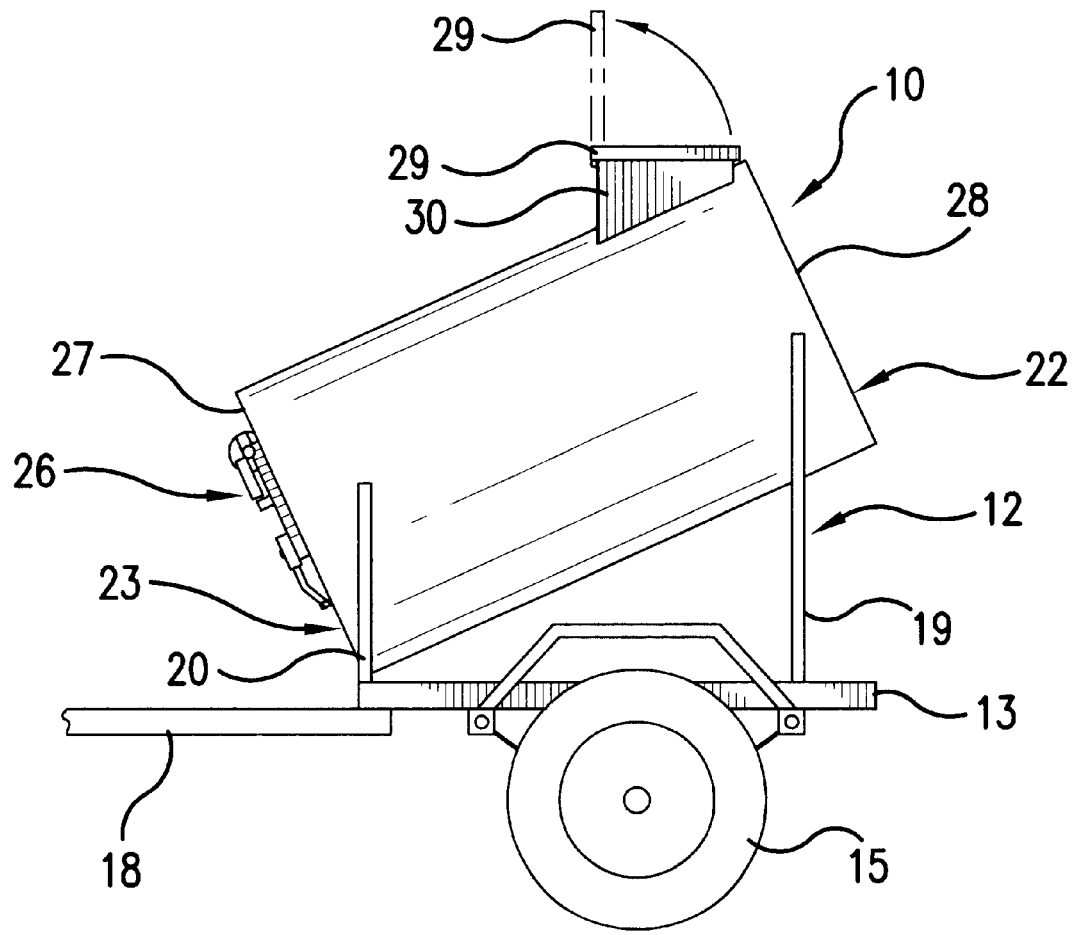
FIG. 2 is a side elevational view of a spreader device according to FIG. 1.

Referring to FIGS. 1 and 2, the spreader device 10 further includes a hollow, barrel-shaped body 21, which is mounted on the frame 12 at a forward angle, with the front portion of the barrel-shaped body 21 being substantially lower than the rear portion 22. Since the rear portion 22 of the barrel body 21 is elevated above the front portion of the body, gravity forces any particulate feed, seed, etc. inside the barrel body 21 to slide down to the front lower portion 23 of the body. Preferably, the two rear frame posts 19 contact the front portion 23 of the barrel-shaped body on opposite sides of the barrel body 21, and the two front frame posts 20 contact a rear portion 22 of the barrel-shaped body on opposite sides of the barrel body 21.

A shown in FIG. 1, a door 24 covers an opening 25 (see FIG. 3B) on the front lower portion of the front face 27 of the barrel body 21. The feed or other particles rest against the distribution door 24 when it is closed. The distribution door 24 is closely fitted so there is no leakage of particles or sticking of the door. The distribution door 24 is opened and closed by a remote-operated door opening mechanism 26 attached to the barrel-shaped body for periodically opening and closing the door, as shown in FIGS. 1 and 2. By "remote-operated" is meant that the door opening mechanism can be operated from some distance away; the operator need not be standing next to the spreader device at the time the door is opened or closed. The door opening mechanism 26 is preferably motor-driven and attached to the circular front face 27 of the barrel-shaped body 21. A portion of the door opening mechanism is operably connected to the distribution door 24. The rear face 28 of the barrel body 21 is preferably about the same size as the front face 27. The circular rear face 28 is simple and does not hold any openings or mechanisms.

As seen in FIG. 2, the angle formed by the bed 13 of the cart and the bottom of the barrel body 21 is about 35 degrees. The barrel body 21 preferably only contacts the cart bed 13 (forming the apex of the angle) at the bottom edge of the body under the door 24. This edge of the barrel body 21 contacts the front edge of the cart 13 over the cart end of the tongue 18. The front portion of the barrel body 21 is sandwiched between the front posts 20 (see FIG. 1). The diameter of the barrel-shaped body is preferably slightly less than the diameter of the ATV, so they can both fit through narrow trails.

Continuing with FIG. 2, the feed or seed is loaded into the hollow barrel body 21 by pouring it through an easily accessible fill door 29 on a short shaft 30 in the upper rear portion of the barrel body 21. This is the highest point of the barrel body, so the feed slides down to the front portion. Thus, the barrel-shaped body 21 has a distribution door 24 covering the opening 25 at a front, lower end 23 of the barrel-shaped body 21, and a fill door 29 covering an opening in an upper, rear portion of the barrel-shaped body. The fill opening is preferably adjacent to the rear face 28 of the barrel body 21.

A full barrel body holds feed all the way up to the fill door 29. The barrel body 21 can accommodate several gallons of feed (preferably between about five and ten gallons), so frequent reloading is not necessary. Its cylindrical shape and the low position of the distribution door 24 in front leave no corners for feed to collect in and rot. The fill door 29, which preferably slightly overhangs the top edges of the shaft 30, protects the particles inside the barrel body from rain, contaminants, etc. A funnel can be used if desired to pour the feed or other particles into the fill door 29. As shown in FIG. 2, the fill door 29 is preferably hinged along one side so that it opens from a closed horizontal position to a fully open, vertical position. The fill shaft 30 is preferably cylindrical or square in shape, with a generally circular- or square-shaped fill door 29, respectively.

Figure 3A:
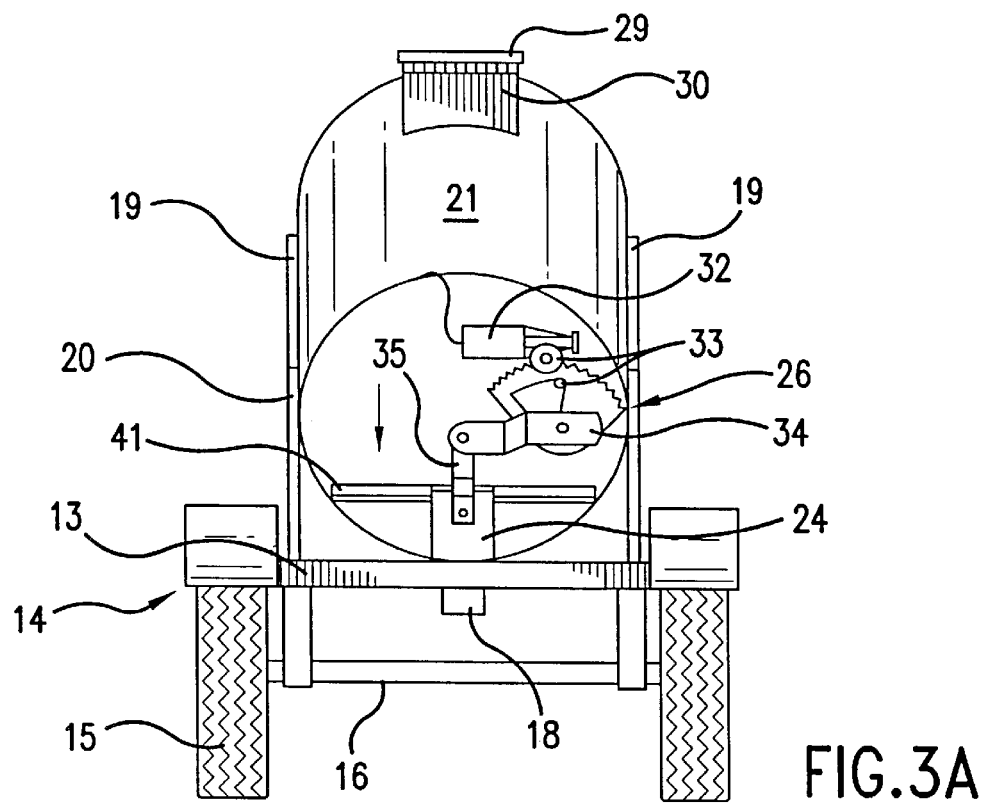
FIG. 3A is a front elevational view of a spreader device according to FIG. 1, shown in a closed position.
Figure 3B:
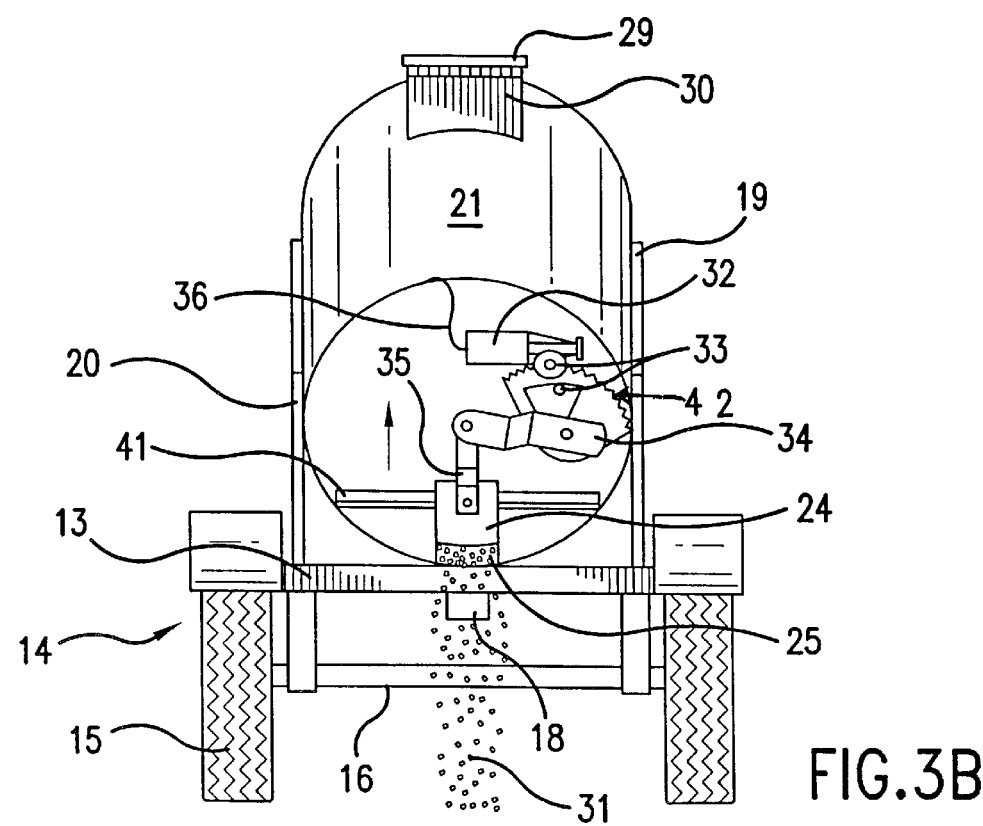
FIG. 3B is a front elevational view of a spreader device according to FIG. 1, shown in an open position.

FIGS. 3A and 3B show the spreader device 10 from the front, with the distribution door 24 in opened (3B) and closed (3A) positions. When the distribution door 24 is opened by the door opening mechanism 26, as shown in FIG. 3B, the particulate feed 31 or other particles spill out onto the ground below the cart 14. Since the cart 14 is being pulled by the vehicle 11 at the time, a trail of particles 31 is left along the ground behind the cart 14. Where less feed or seed is desired, the operator opens the distribution door 24 for shorter and/or less frequent periods. Where more feed or seed is desired, the operator leaves the distribution door 24 opened for longer and/or more frequent intervals. The timing also depends upon the characteristics of the feed, seed, etc. being distributed, including its size, weight, and flowability. Some types of feed, seed, etc. become sticky as they absorb water from humid ambient air. Even though the upper fill opening is kept closed most of the time, it can become humid inside the barrel body 21, depending on ambient conditions. If this happens, any one of a number of suitable, known ingredients may be added that have a greater capacity for water absorption than the feed or seed. Ingredients which inhibit the growth of mold, mildew, etc. within the barrel body 21 may also be included, if desired. Ordinarily, though, feed or seed will not be stored in the barrel body 21. It is recommended that the kernels or other particles for that day should be loaded through the upper fill door 29 just prior to use, and that excess particles not be loaded into the barrel body 21. If necessary, excess particles can be emptied into a bucket placed below the distribution door 24 and stored elsewhere.

The preferred door opening mechanism 26 illustrated in FIGS. 3A and 3B does not extend beyond the edges of the front face 27 of the barrel body 21. The door opening mechanism 26 also lies relatively flush against the front face 27, as seen in FIG. 2. It is therefore accessible for repairs, yet unlikely to snag limbs of passing trees and bushes. It can alternatively be concealed by a cover, if desired. The door opening mechanism 26 comprises a small motor 32 and a regulator 42. The motor 32 has sufficient power to drive the mechanism to open or close the small distribution door. The regulator 42 includes several small intermeshed gears 33, one of which is movably connected to one end of a horizontally oriented arm 34. The arm 34 is movably connected at its opposite end to an end of a vertically oriented leg 35. The opposite, lower end of the leg 35 is connected to the top of the distribution door 24 on the outside.

Continuing with FIGS. 1, 3A and 3B, a wire 36 operably connected at one end to the motor 32 is connected at its opposite end to a remote switch mechanism 37, which is preferably positioned on a handle bar 38 of the ATV 11 (or a steering wheel of a truck). The wire 36 connects the door opening mechanism 26 to the handle bar 38 at the front of the vehicle pulling the spreader device 10 on its cart 14. The switch mechanism 37, 37A is attachable to the handle bar 38 so the driver/operator can operate the door opening mechanism 26 as he or she drives the vehicle. This allows the job of distribution to be done quickly and efficiently by one individual. The remote switch mechanism 37 is preferably positioned on the right handle bar for right-handed drivers. By "remote" is meant that the mechanism for activating the door opening mechanism is some distance away from the barrel body 21, on which the door opening mechanism is seated. The wire 36 is preferably wrapped behind a bead around the circular front face 27 of the barrel body 21 to protect the wire. At the base of the barrel bead where it overhangs the end of the cart tongue 18, the wire 36 is clipped along the tongue 18. From there, the wire 36 extends the length of the ATV 11, emerging at the ATV handle bar 38, as indicated in FIG. 1. The end of the wire 36 is operably connected to the switch mechanism 37 attached to the ATV handle bar 38.

Figure 4:
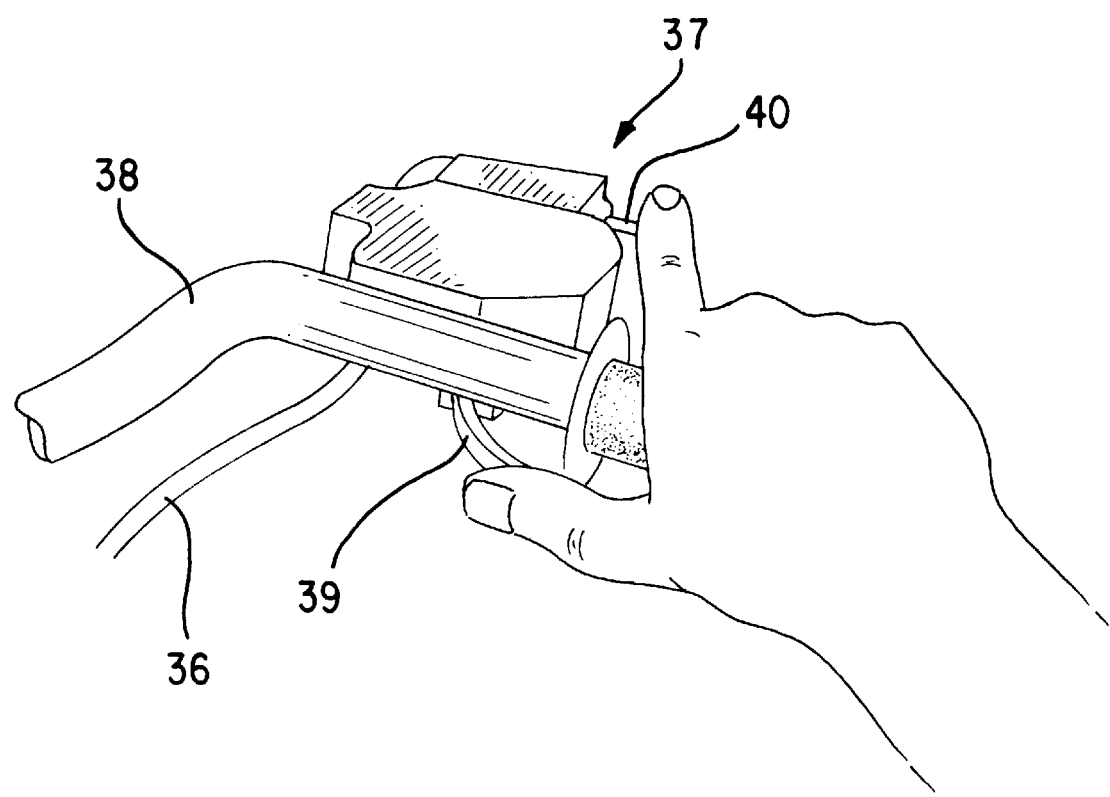
FIG. 4 is a perspective view of a remote switch mechanism of a spreader device according to the present invention, shown attached to a handle of an all-terrain vehicle.

Referring now to FIGS. 3A, 3B, and 4, the distribution door 24 is opened and closed by means of the switch mechanism 37 on the handle bar 38. The door opening mechanism wire 36 attaches at one end to the motor 32 and at an opposite end to the switch mechanism 37. The switch mechanism 37 preferably comprises at least one hand-operated lever 40. A button or toggle or the like may be utilized in place of a lever. To operate the spreader device 10, the driver intermittently presses the lever 40 as he or she drives slowly along the trail. The operator can control the amount of bait, etc. distributed on the ground by controlling the speed of the vehicle 11, the frequency of the squeezes on the lever 40, and the pressure of the squeezes on the lever 40. FIG. 4 shows a gas throttle 39 and the hand-operated lever 40 of the switch mechanism 37. The operator operates the ATV throttle 39 with his or her thumb, as shown in FIG. 4. As the operator drives the ATV along the trail or other terrain, he (or she) uses his or her index finger to operate the lever 40, which is above the level of the ATV handle. In the preferred embodiment, pushing the lever 40 up opens the distribution door 24 over the barrel body opening, which permits the corn or other particles to fall out onto the ground below, as shown in FIG. 3B. Pushing the lever 40 up causes the motor to operate the regulator 42, which pulls the leg 35 up. When the leg 35 is pulled up, the distribution door 24 slides up along its track 41 in the direction of the arrow shown in FIG. 3B. The corn kernels or other particles then fall out. Also, the motion of the ATV along the trail rattles the barrel body 21, which facilitates the trickle of particles from the opening 25.

Figure 4A:
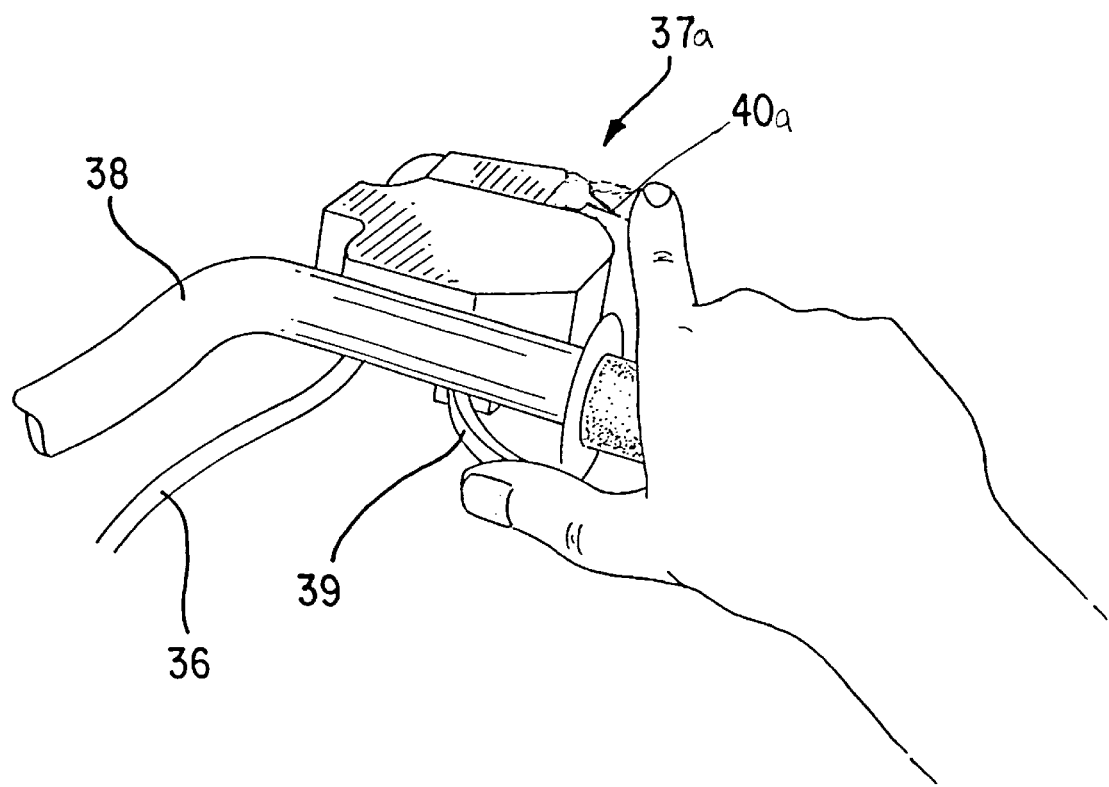

To close the distribution door 24 in this preferred embodiment, the operator pushes his or her index finger down on the lever 40. This causes the leg 35 on the front face of the barrel body to push the distribution door 24 down in its track 41 over the opening 25, as shown by the direction of the arrow in FIG. 3A. Once the distribution door 24 is closed, the flow of particles is halted, as shown in FIG. 3A. As shown in FIG. 4A, the switch mechanism is preferably a limited toggle switch mechanism 37a with a toggle 40a, that the operator can bump up (as shown in outline) to open the door partway, and bump down to lower the door partway.

In this way, a sole operator can distribute bait or other particles along a trail or over other terrain quickly and easily. This embodiment of the spreader device 10 allows the operator the freedom to put more feed in some places and less in others, depending on his or her observations of animal movement on any given day. Also, since the wheels 15 are on the sides of the cart, they do not run over the grain emerging from the distribution door 24 and press it into the earth.

Alternatively, the distribution door opening mechanism can be operated by a wireless remote. In that case, there is be no wire between the motor and switch mechanism. A portable remote control box substitutes for the handle bar-mounted switch mechanism. Buttons on the remote control box are depressed to open or close the distribution door, and the degree to which the distribution door is opened can also be controlled by one or more buttons on the remote.

Another alternate embodiment includes a door opening mechanism 26 powered by a battery instead of a motor. Still another embodiment includes an automatic door opening mechanism with a remote "on-off" switch mechanism. Once the operator turns the automatic mechanism on, it automatically opens and closes the distribution door at timed intervals. Although it lacks the customized feature of the above described, preferred embodiment, this alternate embodiment frees the operator to concentrate on driving and other tasks.

Figure 5:
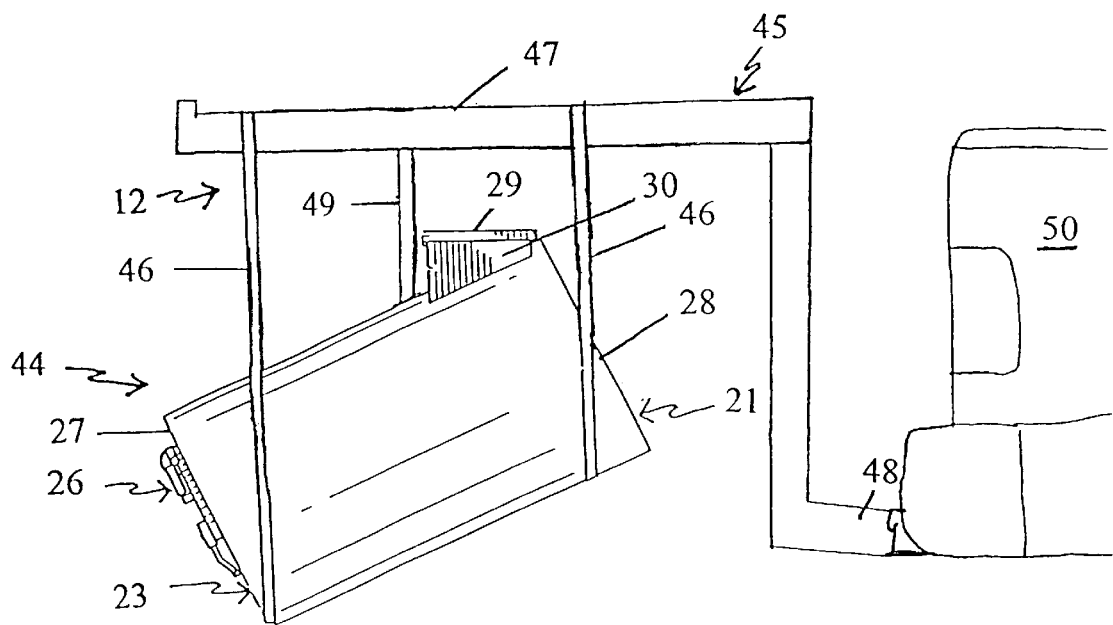
FIG. 5 is a side elevational view of an alternate embodiment of a spreader device according to the present invention.

Finally, FIG. 5 illustrates an alternate embodiment 44 of the spreader device in which the barrel-shaped body 21 is suspended in its tilted position from a frame 12 comprising a beam 45, and at least two straps or cables 46 suspended from a horizontally oriented end portion 47 of the beam extending above the barrel-shaped body 21. The straps or cables 46 are suspended from the beam 45, and preferably extend around the front and rear portions of the barrel-shaped body 21. The barrel-shaped body 21 is thus suspended from the beam 45 in a tilted position, wherein the front portion 23 of the barrel-shaped body is substantially lower than the rear portion 22. An opposite end 48 of the beam is coupleable to the rear 50 of a pick-up truck. Thus, the rear face of the barrel-shaped body 21 faces the back end of the truck. Since there is no cart bed or tongue beneath the distribution door 24 in this embodiment, there is nothing to impede the flow of the grain or other particles from the distribution door 24. A folding or sliding fill door is preferred in this embodiment to facilitate filling the body through the fill door 29. This embodiment 44 may also include a central rod 49 movably or permanently attached at its upper end to the beam 45 and welded or otherwise attached at its lower end to the top of the barrel body 21. The central rod 49 helps to prevent excess rocking of the barrel-shaped body as the truck moves forward over rough ground. This cable/beam embodiment of the device 44 is also advantageous because the driver/operator need not be concerned about the two extra wheels 15 on the cart becoming bogged down in rough terrain. It is particularly useful for distributing feed over open ground to, for example, plains animals at an animal park.

While preferred embodiments of the invention have been described using specific terms, this description is for illustrative purposes only. It will be apparent to those of ordinary skill in the art that various modifications, substitutions, omissions, and changes may be made without departing from the spirit or scope of the invention, and that such are intended to be within the scope of the present invention as defined by the following claims. It is intended that the doctrine of equivalents be relied upon to determine the fair scope of these claims in connection with any other person's product which fall outside the literal wording of these claims, but which in reality do not materially depart from this invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention. It is to be understood that any dimensions given herein are illustrative, and are not meant to be limiting.

BRIEF LIST OF REFERENCE NUMBERS USED IN THE DRAWINGS 10 spreader device
11 all-terrain vehicle
12 frame
13 cart bed 14 cart
15 cart wheels
16 axle
17 ATV wheels
18 cart tongue
19 rear frame posts
20 front frame posts
21 barrel body
22 rear body portion
23 front lower body portion
24 distribution door
25 distribution door opening
26 door opening mechanism
27 front face of body
28 rear face of body
29 fill door
30 fill shaft
31 feed particles
32 motor of door mechanism
33 gears
34 arm
35 leg
36 wire
37 switch mechanism
38 ATV handle bar
39 throttle
40 hand-operated lever
41 door track
42 regulator
44 2nd embodiment—suspended frame
45 beam
46 cable
47 horizontal end of beam
48 truck end of beam
49 rod

What is claimed is:

1. A spreader device for distributing particles over a substantial area of ground, the spreader device comprising:
   (a) a hollow, barrel-shaped body comprising a distribution door covering an opening at a front, lower end of the barrel-shaped body, and a fill door covering an opening in an upper, rear portion of the barrel-shaped body;
   (b) a frame on which the barrel-shaped body is mounted at a forward angle, with the front portion of the barrel-shaped body being substantially lower than the rear portion;
   (c) a remote-operated door opening mechanism attached to the barrel-shaped body for periodically opening and closing the distribution door; and
   (d) a remote switch mechanism for activating the door opening mechanism;
   wherein the spreader device is mounted on a bed of a two-wheeled cart, with a front face of the barrel-shaped body facing forward on the cart; and
   wherein the cart is detachably coupleable to the rear of an all-terrain vehicle, and the switch mechanism is attachable to a handle bar of the all-terrain vehicle.

2. A spreader device according to claim 1, wherein the remote switch mechanism comprises a hand-operated lever.

3. A spreader device according to claim 1, wherein the door opening mechanism comprises: a motor operably connected to a regulator; the remote switch mechanism being operably connected to the motor.

4. A spreader device according to claim 3, wherein the motor operates a leg, a lower end of the leg being movably connected to the distribution door; the distribution door being set in a track.

5. A spreader device according to claim 1, wherein the switch mechanism is a limited toggle switch mechanism.

6. A spreader device according to claim 1, wherein the door opening mechanism is remote-controlled and wireless.

7. A spreader device according to claim 1 wherein the fill door is positioned over a shaft, the shaft projecting vertically from the upper rear portion of the barrel shaped body.

8. A spreader device according to claim 1, wherein the door opening mechanism is motor-driven and is attached to a front face of the barrel-shaped body, a portion of the door opening mechanism being operably connected to the distribution door.

9. A spreader device according to claim 1, wherein the frame is comprised of at least four vertically mounted posts extending in an upward direction from four corners of the generally horizontal cart bed, the frame posts comprising at least two rear posts which are substantially longer than at least two front frame posts.

10. A spreader device according to claim 9, wherein the two rear frame posts are the same height as one another and contact a rear portion of the barrel-shaped body on opposite sides of the body; and the two front frame posts are the same height as one another, and contact a front portion of the barrel-shaped body on opposite sides of the body.

11. A spreader device according to claim 9, wherein the switch mechanism is a limited toggle switch mechanism.

12. A spreader device for distributing particles over a substantial area of ground, the spreader device comprising:
   (a) a hollow, barrel-shaped body comprising a distribution door covering an opening at a front lower end of the barrel-shaped body, and a fill door covering an opening in an upper, rear portion of the barrel-shaped body;
   (b) a frame on which the barrel-shaped body is mounted at a forward angle, with the front portion of the barrel-shaped body being substantially lower than the rear portion;
   (c) a remote-operated door opening mechanism attached to the barrel-shaped body for periodically opening and closing the distribution door; and
   (d) a remote switch mechanism for activating the door opening mechanism;
   wherein the frame comprises at least two cables suspended from a horizontally oriented end portion of a beam; the cables being strapped to the front and rear portions of the barrel-shaped body; the barrel-shaped body being suspended from the beam in an angled position wherein the front portion of the barrel-shaped body is in a substantially lower position than the rear portion of the barrel-shaped body; and
   wherein the spreader device further comprises a central rod attached at an upper end to the beam and at a lower end to the barrel-shaped body.

* * * * *